United States Patent
Staud et al.

(10) Patent No.: US 10,921,053 B2
(45) Date of Patent: Feb. 16, 2021

(54) DOMESTIC APPLIANCE COMPRISING ILLUMINATION DEVICE FOR RECESSED GRIP

(71) Applicant: BSH HAUSGERAETE GMBH, Munich (DE)

(72) Inventors: Ralph Staud, Munich (DE); Thomas Tischer, Haar (DE); Marco Reitwiessner, Munich (DE); Andreas Kessler, Munich (DE); Andreas Korte, Munich (DE); Thomas Ott, Neubiberg (DE); Guenter Gerold, Ellwangen (DE); Robert Sachon, Munich (DE)

(73) Assignee: BSH Hausgeraete GmbH, Munich (DE)

( * ) Notice: Subject to any disclaimer, the term of this patent is extended or adjusted under 35 U.S.C. 154(b) by 0 days.

(21) Appl. No.: 16/609,273

(22) PCT Filed: Apr. 12, 2018

(86) PCT No.: PCT/EP2018/059374
§ 371 (c)(1),
(2) Date: Oct. 29, 2019

(87) PCT Pub. No.: WO2018/202398
PCT Pub. Date: Nov. 8, 2018

(65) Prior Publication Data
US 2020/0049401 A1 Feb. 13, 2020

(30) Foreign Application Priority Data
May 1, 2017 (DE) .................. 10 2017 004 136

(51) Int. Cl.
*F25D 27/00* (2006.01)
*F25D 23/02* (2006.01)
(Continued)

(52) U.S. Cl.
CPC ............ *F25D 27/005* (2013.01); *F25D 11/02* (2013.01); *F25D 23/028* (2013.01);
(Continued)

(58) Field of Classification Search
CPC .. F25D 27/005; F25D 2400/36; F25D 29/005; A47L 15/4293; G09G 2354/10;
(Continued)

(56) References Cited

U.S. PATENT DOCUMENTS

2009/0224933 A1* 9/2009 Jerg .................... G09F 23/0058
340/815.4
2013/0024169 A1* 1/2013 Veerasamy ....... B32B 17/10036
703/2
(Continued)

FOREIGN PATENT DOCUMENTS

CN      106546051 A    3/2017
EP      3043131 A1     7/2016
(Continued)

OTHER PUBLICATIONS

International Search Report for PCT/EP2018/059374 dated Jul. 10, 2018.

*Primary Examiner* — Laurence J Lee
(74) *Attorney, Agent, or Firm* — Laurence A. Greenberg; Werner H. Sterner; Ralph E. Locher (57) ABSTRACT

A domestic appliance, in particular a refrigeration appliance, contains a door having a recessed grip and an illumination device for shining light onto the recessed grip. The illumination device has a projection device for projecting information onto the recessed grip. A method is used to operate a domestic appliance which contains the door having the recessed grip and the projection device for shining light onto the recessed grip, in which method information is projected onto the recessed grip by the projection device. The domes-
(Continued)

tic appliance can be a refrigerator, a freezer, a preservation appliance or combinations thereof.

15 Claims, 6 Drawing Sheets (51) Int. Cl.
    *F25D 29/00*     (2006.01)
    *G03B 21/20*     (2006.01)
    *G06F 3/041*     (2006.01)
    *F25D 11/02*     (2006.01)
    *G09G 3/00*     (2006.01)

(52) U.S. Cl.
    CPC ....... *F25D 29/005* (2013.01); *G03B 21/2033* (2013.01); *G06F 3/041* (2013.01); *G09G 3/001* (2013.01); *F25D 2400/361* (2013.01); *G09G 2354/00* (2013.01)

(58) Field of Classification Search
    CPC ................. G03B 21/2033; D06F 34/28; F24C 7/082–086; H05B 6/6435
    See application file for complete search history.

(56) References Cited

U.S. PATENT DOCUMENTS

| | | | |
|---|---|---|---|
| 2015/0157184 A1* | 6/2015 | Alexander | A47L 15/4285 312/319.5 |
| 2015/0335175 A1* | 11/2015 | Choueifati | A47F 3/0408 62/89 |
| 2016/0186984 A1* | 6/2016 | Giacomini | F21V 33/0044 362/85 |
| 2017/0059238 A1* | 3/2017 | Becke | F25D 27/005 |
| 2017/0333580 A1* | 11/2017 | Cahan | A61L 2/26 |
| 2018/0216830 A1* | 8/2018 | Ivanovic | F25D 29/005 |
| 2018/0224322 A1* | 8/2018 | Wheeler | G01G 19/56 |
| 2020/0173221 A1* | 6/2020 | Shin | F25D 23/028 |

FOREIGN PATENT DOCUMENTS

| | | |
|---|---|---|
| WO | 2006069831 A1 | 7/2006 |
| WO | 2013126946 A1 | 9/2013 |
| WO | 2014160908 A2 | 10/2014 |

* cited by examiner

DOMESTIC APPLIANCE COMPRISING ILLUMINATION DEVICE FOR RECESSED GRIP

BACKGROUND OF THE INVENTION

Field of the Invention

The invention relates to a household appliance, which has a door with a recessed handle and an illumination device for shining light onto the recessed handle. The invention also relates to a method for operating a household appliance of this kind. The invention may be applied with particular advantage to refrigeration appliances such as refrigerators, freezers, chillers or combinations thereof.

WO 2013/126946 A1 discloses an appliance illuminating device, wherein the device has a profiled member that forms a part of a door, drawer or wall of an appliance or is connected thereto, wherein the profiled member has a cavity that is accessible from an outside of the door, drawer or wall in order to receive a light-emitting means. The cavity of the profiled member can be lit up with the aid of the light-emitting means.

SUMMARY OF THE INVENTION

It is the object of the present invention to at least partly overcome the disadvantages of the prior art and in particular to provide a household appliance having a recessed handle that has a particularly high-quality appearance and is particularly user-friendly.

This object is achieved by the features of the independent claims. Preferred embodiments can be found in particular in the dependent claims.

The object is achieved by a household appliance having a door with a recessed handle and an illumination device for shining light onto the recessed handle, wherein the illumination device has a projection device for projecting information onto the recessed handle.

This household appliance has the advantage that it can be given a particularly compact construction. In particular, an independent display panel in the door can be dispensed with, or a display panel of this kind can be kept particularly small. This in turn contributes to a particularly uncluttered and high-quality appearance. Moreover, the light projection makes it possible to present information on a large number of materials, such as metal, leather, wood, plastics, etc. It is possible to dispense with providing a screen or segmented displays, etc., with the result that even non-planar surfaces can be utilized for presenting information inexpensively and without any particular complexity. Moreover, when the projection device is switched off, a recessed handle of uniform appearance can be achieved.

The household appliance may be a large household appliance, for example a refrigeration appliance (e.g. a refrigerator, freezer, chiller, etc., or any combination thereof), a dish-handling appliance (e.g. a dishwasher, sterilizer, etc. or any combination thereof), a cooker (e.g. an oven, microwave oven, steamer, etc., or any combination thereof), etc. The household appliance may have one or more doors, in particular a plurality of doors as described above.

The term "recessed handle" may in particular be understood to mean a depression or recess that is made in the door and in which a user engages, at least for pulling the door open. The recessed handle is located in particular in the region of a door edge that is opposite an axis of rotation or pivoting. The recessed handle in particular takes an elongated form along an extent of the door edge. The recessed handle may extend over virtually the entire length of the door edge. The recessed handle may take a form resembling a profile. It may in particular take the form of a profiled member that forms or is connected to a part of a door of the household appliance.

The projection device is thus set up and arranged to project light-based information onto the recessed handle. The projection device may for this purpose have one or more light sources. The household appliance may have a plurality of recessed handles and/or a plurality of projection devices.

The information may include at least one graphic element such as a graphic sign (e.g. a symbol, letter, number, etc.), at least one abstract geometric object (e.g. a circle, rectangle, etc.) and/or at least one image of a physical object (e.g. food, a scale, ice cubes, etc.).

The possibility of projecting information "onto" the recessed handle may include the possibility of projecting the information into the recessed handle or the cavity thereof and/or onto a handle margin of the recessed handle. The possibility of projecting information onto the recessed handle using the projection device includes in particular the possibility of projecting the information onto a projection surface associated with the recessed handle. This projection surface in particular takes a form that is not transparent but is reflective, for example reflective in a diffuse manner. It is possible for graphic elements that are not generated by light or are permanent to be located on the projection surface, e.g. printed-on or embossed graphic elements. These graphic elements may be illuminated locally by the projection device in order to highlight them visually. The projected information may in this case comprise for example an appropriately delimited spot of light (spotlight), a light pointer, a ring of light, etc.

In a development, the projection device takes a form and is arranged such that it radiates light in the region of the recessed handle. This can include the projection device radiating light from a region of a handle margin of the recessed handle, and/or radiating light from a wall of the cavity in the recessed handle. In particular, the light may be projected from a handle margin of the recessed handle onto an opposite handle margin, light may be projected from a handle margin of the recessed handle into the cavity in the recessed handle, light may be projected from the wall of the cavity onto a handle margin, and/or light may be projected from the wall of the cavity onto another region of the wall.

In an embodiment, the projection device is integrated into the door. This makes a particularly compact arrangement possible. Moreover, the projection device can consequently be moved with the recessed handle, with the result that projection is possible even when the door is open.

In a development, the projection device is integrated into an edge region of the door having the recessed handle. Thus, particularly simple assembly is made possible. As an alternative or in addition, the projection device may be located in the door but at a distance from the recessed handle, and light radiated therefrom may be guided to the recessed handle by means of at least one light guide.

In another embodiment, the projection device radiates light outside the recessed handle, and light that it radiates falls into the recessed handle through an engagement opening in the recessed handle. This makes a particularly simple embodiment of the recessed handle possible. In that case, the projection device may also be located outside the recessed handle. As an alternative or in addition, the light from the projection device located outside the recessed handle may fall on a handle margin of the recessed handle. This projection device may be located for example on another door.

Thus, in a development the projection device is located outside the door whereof it illuminates the recessed handle. The projection device may be arranged for example on a door that is adjacent to the door having the recessed handle. The door having the projection device and the door having the recessed handle may be doors of a single household appliance. These two doors may be arranged next to one another, in which case the projection device and the recessed handle are located for example on opposite vertical door edges. The two doors may also be arranged one above the other, in which case the projection device and the recessed handle are located for example on opposite horizontal door edges.

In another embodiment, the projection device has at least one light-emitting diode (LED) ("LED projector"), downstream of which, from an optical point of view, there is an image-creating element. A projection device of this kind enables a high level of luminosity at low cost and has a very long service life. The image-creating element is located in the light path of the light radiated by the at least one light-emitting diode, and overlays information onto the light, e.g. by generating a variation in brightness and/or color. In other words, the image-creating element generates a light radiation pattern that carries or has the information.

The image-creating element may be a reflecting element or a transmitting (transparent) element.

In a further embodiment, the image-creating element is a static light-transmitting element. This makes possible a particularly compact and inexpensive arrangement. The static light-transmitting element may take the form of a slide or transparency.

In yet another embodiment, the image-creating element is an image-variable light-transmitting element. This makes it possible to project dynamic information. An image-variable light-transmitting element may be a screen, such as a liquid crystal screen. The screen may be a screen that is controllable by pixel or by segment.

The projection device may project information in general statically or dynamically. Dynamic projection may include a movement, change in brightness, change in color, etc. of the at least one graphic element.

In a further embodiment, the projection device has at least one laser projector or is a laser projector. Use of the laser projector produces the advantage that the image it generates is particularly sharp, because of the narrow, low-divergence laser beams, even if the angles of incidence at which an at least one laser beam emitted thereby falls on a projection surface are not constant or indeed are at a pronounced angle. It is thus possible, using a laser projector, for a particularly high level of image sharpness to be achieved, even onto projection surfaces that are oriented in a non-planar manner and/or at a pronounced angle. This is particularly advantageous for projection onto a recessed handle, with its frequently non-planar surfaces. As a result, the laser beam does not need a complex optical system for focusing the beam, either, and can be of particularly compact construction. In particular, the laser projector can project the laser light without focusing it.

The laser projector may emit one or more laser beams. The laser beams may comprise laser light of the same color or of different colors. Thus, in principle the laser projector also makes it possible to present or project colored information. Consequently, in a development the laser projector is a laser projector that emits a single-color light, e.g. red or green light. In a further development, the laser projector is a laser projector that emits multicolored light. The multicolored light may be chromatic or achromatic (e.g. white) light. The same applies analogously to other projection devices.

In general, at least one optical element for forming a beam may be located in a light path of the light or bundle of light that is generated by the illumination device, this optical element being for example at least one lens, at least one reflector, at least one prism, etc.

Moreover, in one embodiment, the recessed handle is set up as an operating device having at least one actuation region for operating the household appliance, wherein labeling information may be projected onto the actuation region for labeling thereof, by means of the projection device. This makes a particularly versatile utilization of the recessed handle possible. There is in principle no restriction on the type of labeling information, which may include alphanumeric characters (letters or numerals, etc.), symbols, images, etc.

The term "actuation region" may be understood in general to mean a three-dimensional region or a two-dimensional surface ("surface region"). If the actuation region is a three-dimensional region, then the phrase "actuation of the actuation region" may in particular be understood to mean introducing an object into the three-dimensional region. If the actuation region is a surface region, then the phrase "actuation of the actuation region" may in particular be understood to mean touching the surface region with an object.

In particular, if the actuation region is a surface region, it may take the form of a touch-sensitive region ("touch panel"). An associated touch-sensitive panel ("touch panel") may be a surface of the recessed handle, or be located below the free surface. The touch panel may thus comprise one or more touch panels. The touch panel may take the form of a touch-sensitive film ("touch film"). The touch panel may be a resistive, capacitive, inductive, etc. touch panel.

In another embodiment, the recessed handle has a plurality of touch-sensitive regions onto each of which respective information regions can be projected.

Moreover, in one embodiment, the household appliance has a position detector for detecting a position of an object introduced into the recessed handle, and for this purpose is set up to determine the position of the object introduced into the recessed handle in relation to at least one actuation region, and to trigger an action if the object reaches the actuation region. In other words, an action is triggered if the object actuates a particular actuation region. The actuation may be detected by the position detector.

In a development, the household appliance is set up to determine a position of the object introduced into the recessed handle in relation to a plurality of actuation regions, and to trigger a respective action if the object reaches or actuates one of the actuation regions.

Moreover, in another embodiment a plurality of actuation regions are arranged in a line along a longitudinal extent of the recessed handle. This produces the advantage that the actuation regions are arranged particularly clearly visibly and can be operated easily. In particular, all the actuation regions may be arranged in a line along a longitudinal extent of the recessed handle.

In a development, if a plurality of actuation regions are arranged in a line along a longitudinal extent of the recessed handle, the projection device has a plurality of light sources arranged directly opposite the plurality of actuation regions. In that case, the projection device may also be designated a light source strip. For example, the light source strip may comprise a plurality of LEDs ("LED strip"), downstream of which there is a respective static light-transmitting element. The LEDs illuminate surface regions of the recessed handle that are part of or associated with respective actuation regions.

In a development, if a projection device has a plurality of light sources, these light sources may be controlled individually, in particular with their brightness being individually adjustable. This makes a particularly uncluttered and clearly visible presentation of information possible. For example, actuation regions whereof the setting(s) is/are currently active may be illuminated more brightly. Thus, for example, in a refrigerator a plurality of actuation regions—arranged for example in a line—may be used to set different temperatures inside the refrigerator. Here, items of information in the form of temperatures that may be set inside the refrigerator are projected onto or into respective actuation regions. If a user actuates an actuation region, the associated temperature inside the refrigerator is set. It is then possible to present the temperature inside the refrigerator that is current or has just been set to be particularly bright and/or highlighted in another way.

Moreover, in one embodiment the position detector has a plurality of light barriers arranged along a longitudinal extent of the recessed handle. In this way, it is possible to detect a longitudinal position of an object along the recessed handle with sufficient accuracy and with a low level of complexity for the assessment. This may be done for example in that a particular actuation element is associated with a light barrier and an interruption in a light beam by the light barrier is interpreted, or acts, as actuation of the actuation element. In a development that is advantageous for improved determining accuracy, at least one light barrier is arranged on a longitudinal section of the recessed handle on which there is located only one actuation element.

Moreover, in one embodiment the position detector has at least one IR sensor or is an infrared (IR) sensor. An IR sensor makes it possible to reliably detect a position of a finger or other body part of a user and thus also correspondingly to detect actuation. Moreover, using the IR sensor it is possible to a large extent to eliminate the possibility of erroneous actuation. The IR sensor may have one or more IR elements (such as IR diodes) and/or one or more IR cameras. For example, and similarly to the light barriers, IR elements may be arranged opposite respective actuation regions.

In another embodiment, the position detector has at least one proximity sensor. This may for example be used, for example arranged, in a manner analogous to an IR sensor.

In another embodiment, the position detector has at least one camera by means of which it is possible to perform object detection visually.

The object is also achieved by a method for operating a household appliance that has a door with a recessed handle and a projection device for shining light onto the recessed handle, wherein in the method information is projected onto the recessed handle by means of the projection device. The method may take a form analogous to the household appliance described above, and has the same advantages.

The properties, features and advantages of this invention that have been described above, and the manner in which these are achieved, will be more readily and clearly understood from the schematic description below of an exemplary embodiment, which is explained in more detail in conjunction with the drawings.

DESCRIPTION OF THE INVENTION

Figure 1:
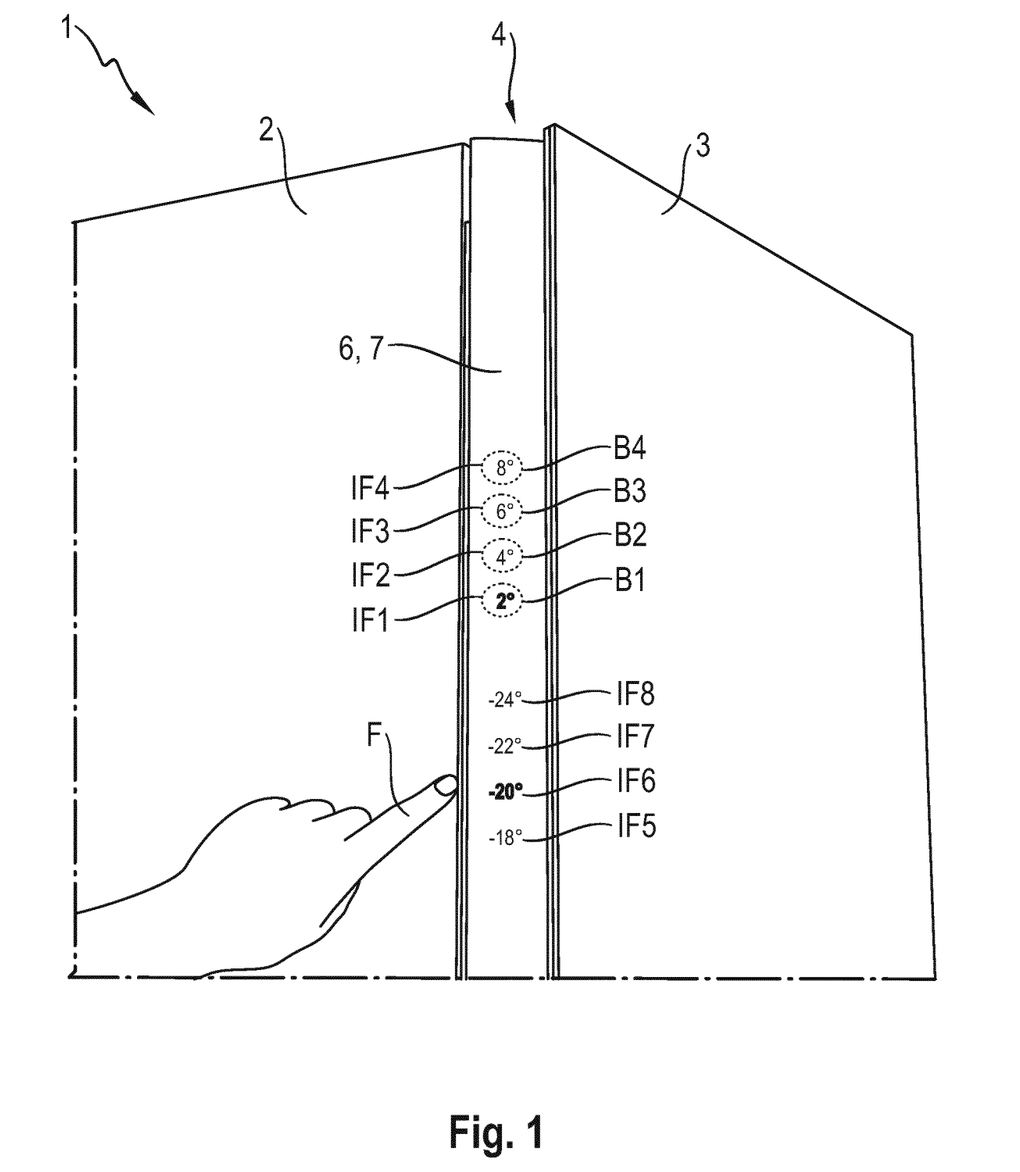
FIG. 1 shows, in an oblique view, a detail of a household appliance in the form of a refrigerator according to a first exemplary embodiment.

FIG. 1 shows, in an oblique view from front left, a detail of a household appliance in the form of a refrigerator 1 according to a first exemplary embodiment. On the front, the refrigerator 1 has a door 3 that is hinged on the right to a carcass 2 and that has, on its left-hand marginal region or door edge, a vertically continuous recessed handle 4.

Integrated in the door 3 is a projection device in the form of an LED projector 5 (see FIG. 2A and FIG. 2B) that serves to project information IF1 to IF8 into the recessed handle 4, in this case onto a wall 6 of an associated cavity 7. The information IF1 to IF8 corresponds to temperature values that can be set. The temperature values are grouped into two groups, which correspond to a first group for temperature values of a refrigerator compartment, where IF$1=2°$, IF$2=4°$ IF$3=6°$ and IF$4=8°$, and a second group for temperature values of a freezer compartment, where IF$5=-18°$, IF$6=-20°$, IF$7=-22°$ and IF$8=-24°$.

The items of information IF1 to IF8 are projected in a straight line along a vertical longitudinal extent of the recessed handle 4 onto the wall 6, grouped into groups with the numerical values of the temperatures increasing from bottom to top.

In the region of the recessed handle 4, the refrigerator 1 has a position detector (not illustrated) that operates in contactless manner, for detecting a position of an object that is introduced into the recessed handle, e.g. a finger F of a user's hand. This allows a position of the finger F to be detected in relation to regions in which the information IF1 to IF8 is projected onto the wall 6. These regions (indicated by dashed lines) correspond to actuation regions B1 to B8 (see also FIG. 2A). Consequently, the actuation regions B1 to B8 are also arranged in a line along the longitudinal extent of the recessed handle 5. The items of information IF1 to IF8 may be regarded as labeling information for the actuation regions B1 to B8. Thus, the recessed handle 6 has an operating panel IF1 to IF8, B1 to B8 that is represented visually by light.

If the finger F comes sufficiently close to one of the actuation regions B1 to B8, this is interpreted as actuation of this actuation region B1 to B8. At least one respective action can be triggered by the actuation, for example a temperature is set to the temperature value associated with the information IF1 to IF8 and the associated information IF1 to IF8 is visually highlighted by means of the LED projector 5. The visual highlighting may comprise a brighter projection than that of the other temperature values in this group.

Figures 2A, 2B:
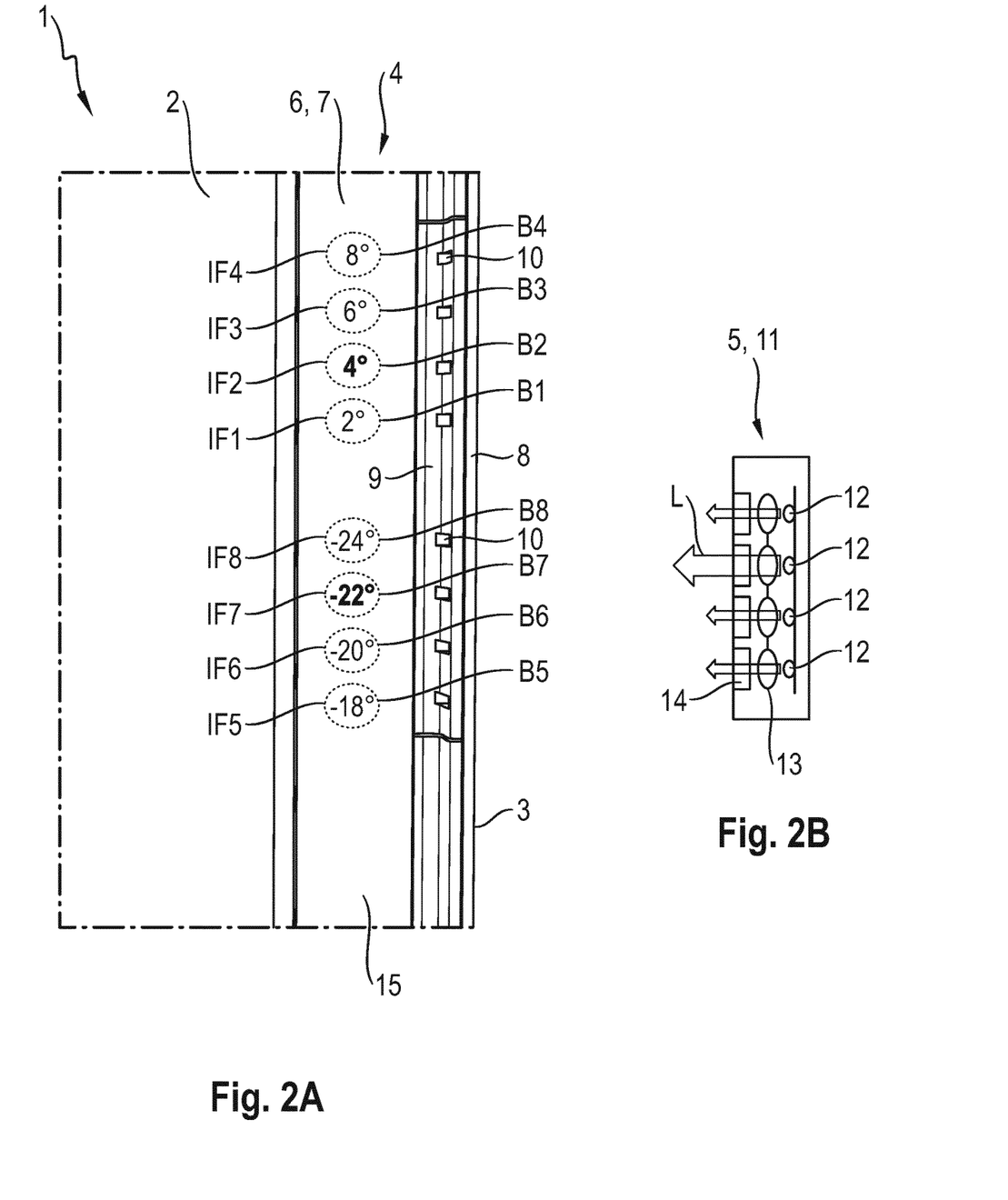
FIG. 2A shows, in a side view, a detail of FIG. 1, in the region of a recessed handle of a door of the refrigerator according to the first exemplary embodiment.
FIG. 2B shows, in a side view, a projection device of the refrigerator according to the first exemplary embodiment.

FIG. 2A shows, in a side view, a detail of FIG. 1 in the region of the recessed handle 4. The LED projector 5 is arranged in the region of a front plate ("door plate" 8) of the recessed handle 5. The LED projector 5 is covered on the recess side by a strip-like cover 9 that has apertures 10 for light to pass through. Each light-passage aperture 10 is located opposite one of the actuation regions B1 to B8. Each of the items of (labeling) information IF1 to IF8 is generated by means of light emerging from the light-passage aperture 10 opposite.

FIG. 2B shows, in a side view, a sketch of an LED module 11 of the LED projector 5. The LED projector 5 can have a respective LED module 11 for each of the two groups IF1 to IF4 and IF5 to IF8. Each of the two LED modules has an LED 12 whereof light L can be focused using a respective optical system 13. A respective image-creating element, which is downstream of the optical systems 13 from an optical point of view, in this case takes the form of for example of a static light-transmitting element 14—for example in the form of a template or transparency. By means of the light-transmitting elements 14, the light L radiated from an LED 12 is overlaid with the appropriate information IF1 to IF8 and is then projected onto the wall 6.

The LEDs 12 may be controlled individually, in particular may be dimmed. As a result, the brightness of the respectively radiated light L can be adjusted, as indicated here by the different surface-area sizes of the associated arrows. In the illustration shown, the items of information IF2 and IF7 are projected more brightly, as they correspond to the temperatures 4° C. and −22° C. that are currently set. This is achieved in that the associated LED 12 shines more brightly than the other LEDs 12. For control thereof, the LED projector may be connected to a control device (not illustrated) of the refrigerator 1.

Figure 3A:
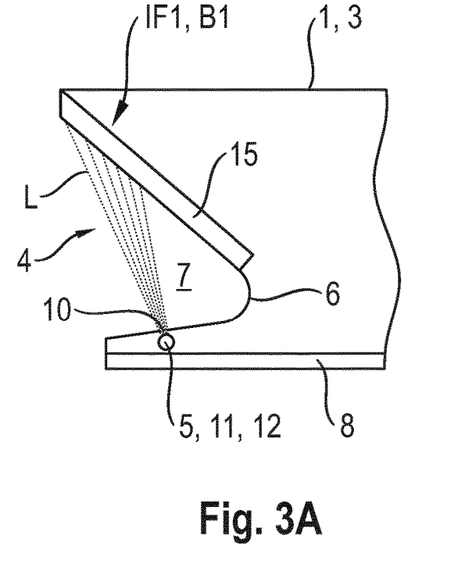
FIG. 3A shows, as a sectional illustration in plan view, a detail of FIG. 1 in the region of the recessed handle of the door of the refrigerator according to the first exemplary embodiment.

FIG. 3A shows, as a sectional illustration in plan view, a sketched detail in the region of the recessed handle 5, at the level of the information IF1 or the actuation region B1. At the location of the information IF1 or the actuation region B1, the recessed handle 4 may have a surface layer 15, for example made of wood, metal, plastics, glass, leather, etc.

Figure 3B:
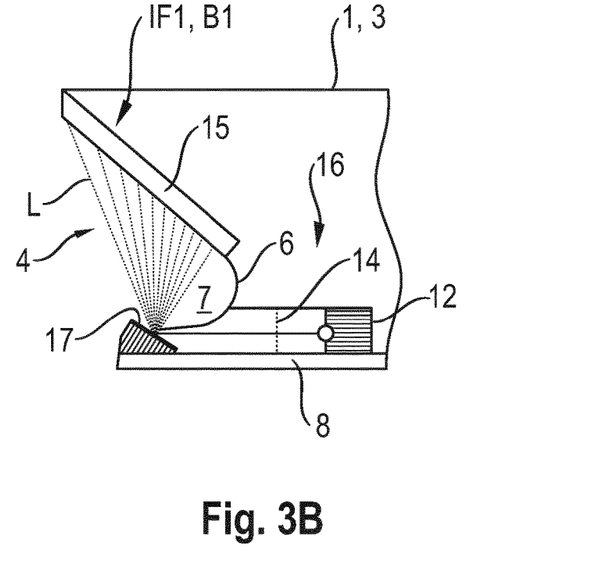
FIG. 3B shows, as a sectional illustration in plan view, a first variant of the door from FIG. 3A.

FIG. 3B shows, as a sectional illustration in plan view, a first variant of the door 3. The LEDs 12 of the LED modules 16 are in this case arranged laterally offset from the recessed handle 4. The light L that they emit is initially radiated into the region of the recessed handle 4 over a certain path, in this case parallel to a door front. This path may be an air path or a light guide. The static light-transmitting element 14 is located within the path.

In the region of the door plate 8, there is a deflector mirror 17 by means of which the light L bearing the information is projected onto the layer 15.

Figure 3C:
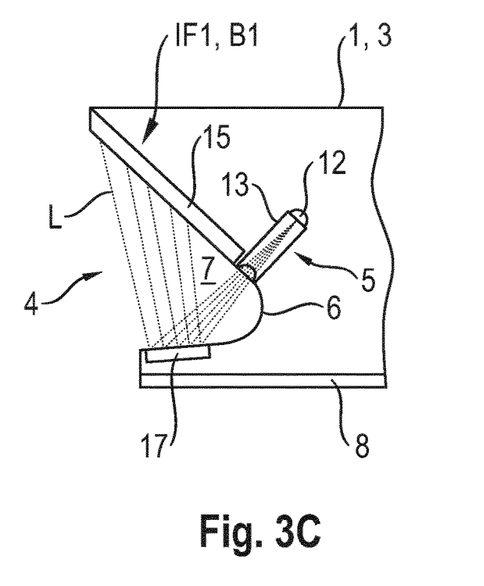
FIG. 3C shows, as a sectional illustration in plan view, a second variant of the door from FIG. 3A.

FIG. 3C shows, as a sectional illustration in plan view, a second variant of the door 3. In contrast to FIG. 3B, in this case the LED module 5 is not located on the door plate 8 but next to the layer 15, and radiates the light L through the cavity 7 and onto a deflector mirror 17.

Figure 3D:
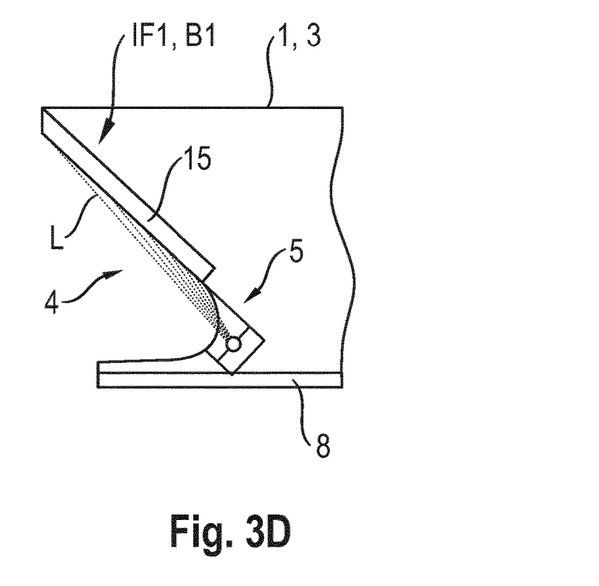
FIG. 3D shows, as a sectional illustration in plan view, a third variant of the door from FIG. 3A.

FIG. 3D shows, as a sectional illustration in plan view, a third variant of the door 3. Here, the deflector mirror 17 is omitted. The light L falls, directly but at a pronounced angle (where appropriate just glancingly) onto the layer 5. The LED module 5 may in this case be oriented parallel or approximately parallel to a free surface of the layer 15.

Figure 4:
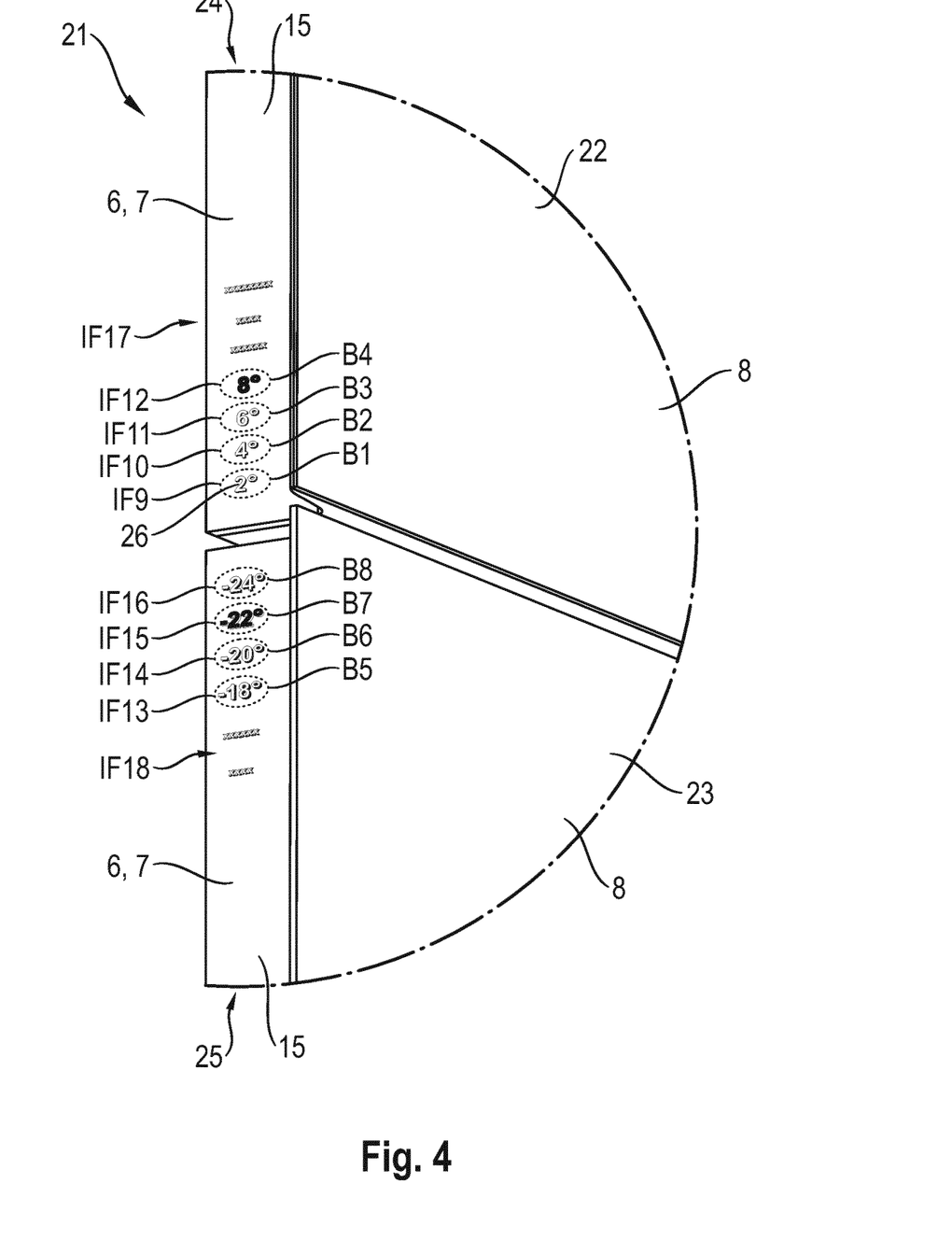
FIG. 4 shows, in an oblique view, a detail of a household appliance in the form of a refrigerator according to a second exemplary embodiment.

FIG. 4 shows, in an oblique view, a detail of a household appliance in the form of a dual refrigeration appliance 21 according to a second exemplary embodiment, wherein the dual refrigeration appliance 21 has two refrigeration compartments (e.g. an upper refrigerator compartment and a lower freezer compartment) that are arranged one above the other, with an upper door 22 and a lower door 23. The doors 22 and 23 each have an LED projector (not illustrated) in order to project associated items of information IF9 to IF12 and IF13 to IF16 onto the associated actuation regions B1 to B4 and B5 to B8 of respective recessed handles 24 and 25. In addition, information IF17 and IF18 is projected into the recessed handles 24 and 25 by the LED projectors. One or more actuation regions may, but need not, be associated with the items of information IF17 and IF18.

In contrast to the refrigerator 1, the items of information IF9 to IF18 do not take the form of labeling information but of spots of light or spotlights. The spots of light are projected locally onto respective labels 26 that are permanently present on the layer 15 of the respective recessed handle 23 and 24. The labels 26 may be printed, engraved, embossed, etc. Here, the labels 26 correspond to temperature values that may be set, and to further texts (such as "extra" or "vacation", etc.). In the illustration shown, only the labels 26 "8°" and "−22°" are illuminated by the items of information IF12 and IF15 in the form of spotlights and are thus deliberately highlighted. The other items of information are not active. If a user actuates another label 26, this other label can be highlighted by projection by means of a spotlight.

Figure 5:
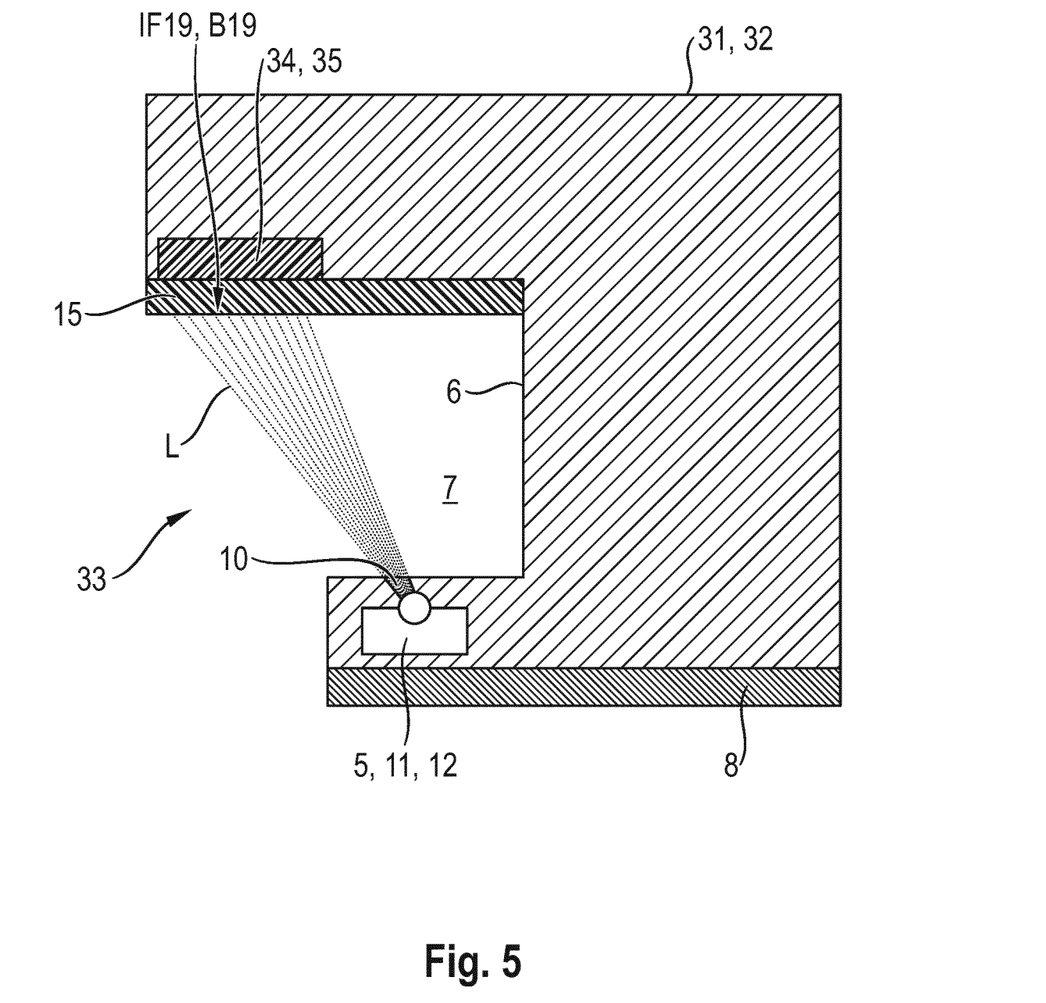
FIG. 5 shows, as a sectional illustration in plan view, a detail of a door of a refrigerator according to a third exemplary embodiment, in the region of a recessed handle.

FIG. 5 shows, as a sectional illustration in plan view, a detail of a door 32 of a refrigerator 31 according to a third exemplary embodiment, in the region of a recessed handle 33. The door 32 is constructed in a manner similar to the door 3, in particular according to the embodiment of FIG. 3A. However, the door 32 does not have a position or presence detector that operates in contactless manner, but rather a touch film 34 with a plurality of touch-sensitive regions, of which here one touch-sensitive region 35 ("touch panel") is shown. The touch film 34 is installed behind the layer 15 but may as an alternative also form the free surface or wall 6 of the recessed handle 33. The actuation regions correspond to surface regions of the layer 15 over the touch-sensitive regions 35.

Respective (labeling) information regions IF19 are projected onto the actuation regions B19, for example with labels that correspond to temperature values or other operating parameters, etc. Actuation of an actuation region B19 may be detected by means of the touch film 34 as a result of its being touched.

Figure 6:
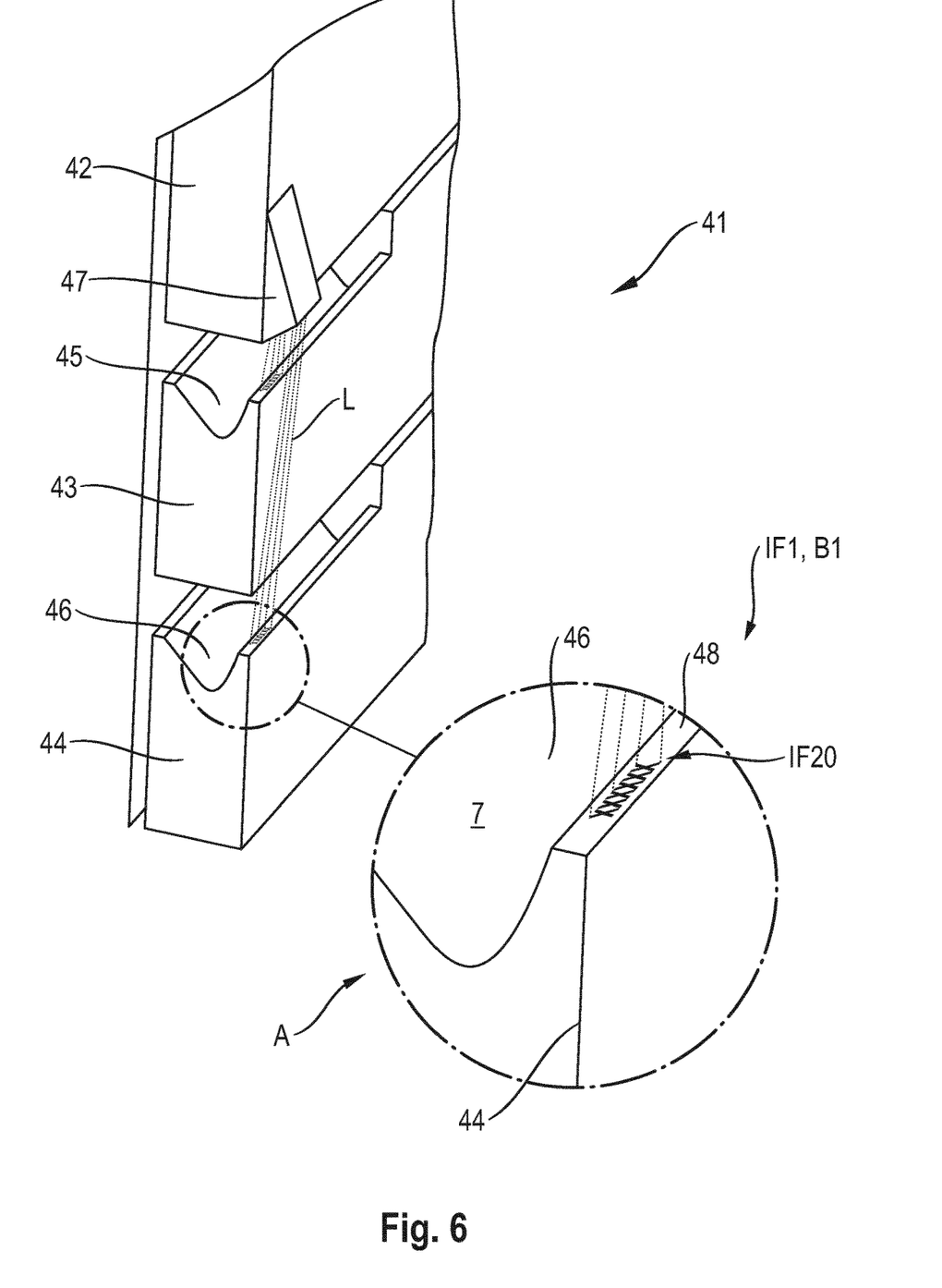
FIG. 6 shows, in an oblique view, a detail of a household appliance in the form of a refrigerator according to a fourth exemplary embodiment.

FIG. 6 shows, in an oblique view, a detail of a household appliance in the form of a refrigeration appliance 41. The refrigeration appliance 41 has a plurality of doors 42, 43 and 44 that are arranged one above the other and of which the lower two doors 43 and 44 each take the form of drawer doors and have recessed handles 45 and 46 respectively at the top. The topmost door 42 has a projection device 47 that can project light, in the form of information IF20, from above onto the upper sides or upper door edges of the doors 43 and 44 underneath. Thus, the projection device 47 radiates its light L from outside the recessed handle 46.

As illustrated in the enlarged detail A, the information IF20 is not projected into the cavity 7 in the recessed handle 46 but onto a handle margin 48 of the recessed handle 46. The handle margin 48 of the recessed handle 46 may, but need not, have corresponding actuation elements (in particular touch-sensitive actuation elements). As an alternative or in addition, the projection device 47 may radiate its light L into the cavity 7, that is to say through an engagement opening in the recessed handle 46.

It goes without saying that the present invention is not restricted to the exemplary embodiment shown.

Thus, instead of one or more LED projectors, one or more laser projectors may be used.

It is also possible to use image-variable light-transmitting elements, e.g. an LCD screen, instead of static light-transmitting elements.

In general, the terms "one", "a", etc. may be understood as a singular or a plural, in particular in the context of "at least one" or "one or more", etc., provided this is not explicitly ruled out, for example by the phrase "exactly one", etc.

It is also possible for a numerical specification to include precisely the stated number and also a conventional tolerance range, provided this is not explicitly ruled out.

LIST OF REFERENCE NUMERALS

1 Refrigerator
2 Carcass
3 Door
4 Recessed handle
5 LED projector
6 Wall of the recessed handle
7 Cavity of the recessed handle
8 Door plate
9 Cover
10 Light-passage aperture
11 LED module
12 LED
13 Optical system
14 Light-transmitting element
15 LED module
16 LED module
17 Deflector mirror
21 Dual refrigerator
22 Door
23 Door
24 Recessed handle
25 Recessed handle
26 Label
31 Refrigerator
32 Door
33 Recessed handle
34 Touch film
35 Touch-sensitive region
41 Refrigeration appliance
42 Door
43 Door
44 Door
45 Recessed handle
46 Recessed handle
47 Projection device
48 Handle margin of the recessed handle
B1-B19 Actuation region
IF1-IF20 Projected information
F Finger
L Light

The invention claimed is:

1. A household appliance, comprising:
a door having a recessed handle;
an illumination device for shining light onto said recessed handle, said illumination device having a projection device for projecting information onto said recessed handle; and
said recessed handle being set up as an operating device having at least one actuation region for operating the household appliance, wherein labeling information is projected onto said at least one actuation region for labeling said at least one actuation region, by way of said projection device.

2. The household appliance according to claim 1, wherein said projection device is integrated into said door.

3. The household appliance according to claim 2, wherein said projection device is integrated into an edge region of said door having the recessed handle.

4. The household appliance according to claim 1, wherein:
said recessed handle has an engagement opening formed therein; and
said projection device radiates the light outside said recessed handle, and the light falls into said recessed handle through said engagement opening in said recessed handle.

5. The household appliance according to claim 1, wherein said projection device has at least one light-emitting diode, downstream of which, from an optical point of view, there is an image-creating element.

6. The household appliance according to claim 5, wherein said image-creating element is a static light-transmitting element.

7. The household appliance according to claim 5, wherein said image-creating element is an image-variable light-transmitting element.

8. The household appliance according to claim 1, wherein said projection device is a laser projector or a light emitting diode projector.

9. The household appliance according to claim 1, further comprising a position detector for detecting a position of an object introduced into said recessed handle, and said position detector is set up to determine the position of the object introduced into said recessed handle in relation to at least one actuation region, and to trigger an action if the object reaches the actuation region.

10. The household appliance according to claim 9, wherein said position detector has a plurality of sensitive regions disposed along a longitudinal extent of said recessed handle.

11. The household appliance according to claim 9, wherein said position detector has at least one infrared sensor.

12. The household appliance according to claim 9, wherein said position detector has a plurality of touch-sensitive regions onto which respective information regions may be projected.

13. The household appliance according to claim 1, wherein said actuation region is one of a plurality of actuation regions disposed in a line along a longitudinal extent of said recessed handle.

14. The household appliance according to claim 1, wherein the household appliance is a refrigeration appliance.

15. A method for operating a household appliance that has a door with a recessed handle set up as an operating device having at least one actuation region for operating the household appliance, which comprises the steps of:
   providing a projection device for shining light onto the recessed handle; and
   projecting labeling information onto the at least one actuation region of the recessed handle for labeling the at least one actuation region by way of the projection device.

\* \* \* \* \*